United States Patent [19]

Quatieri, Jr. et al.

[11] Patent Number: 4,742,510
[45] Date of Patent: May 3, 1988

[54] NEAR AND FAR ECHO CANCELLER FOR DATA COMMUNICATIONS

[75] Inventors: Thomas F. Quatieri, Jr.; Gerald C. O'Leary, both of Lexington, Mass.

[73] Assignee: Massachusetts Institute of Technology, Cambridge, Mass.

[21] Appl. No.: 848,723

[22] Filed: Apr. 4, 1986

[51] Int. Cl.[4] .............................................. H04B 3/22
[52] U.S. Cl. .................................... 370/32.1; 379/410
[58] Field of Search ............... 379/410, 411, 406, 405; 370/32, 32.1; 375/14, 15

[56] References Cited

U.S. PATENT DOCUMENTS

| | | | |
|---|---|---|---|
| 4,074,086 | 2/1978 | Falconer et al. | 379/410 |
| 4,087,654 | 5/1978 | Mueller | 379/32.1 X |
| 4,247,940 | 1/1981 | Mueller et al. | 375/14 |
| 4,355,406 | 10/1982 | Guidoux | 375/82 |
| 4,464,545 | 8/1984 | Werner | 370/32.1 |
| 4,481,622 | 11/1984 | Cheng et al. | 370/30 |
| 4,531,220 | 7/1985 | Brie et al. | 375/14 |
| 4,535,206 | 8/1985 | Falconer | 370/32.1 |
| 4,549,048 | 10/1985 | Combier | 370/32.1 |
| 4,577,309 | 3/1986 | Barazeche et al. | 370/32 |
| 4,602,133 | 7/1986 | O'Neill | 370/32.1 |
| 4,613,731 | 9/1986 | Godard | 379/410 |
| 4,621,173 | 11/1986 | Guidoux | 370/32.1 |
| 4,682,358 | 7/1987 | Werner | 379/411 |
| 4,688,245 | 8/1987 | Schenk | 379/410 |

FOREIGN PATENT DOCUMENTS

0145022 6/1985 European Pat. Off. .
4540 10/1985 PCT Int'l Appl. .

OTHER PUBLICATIONS

"Nonlinear Echo Cancellation of Data Signals, O. Agazzi et al., IEEE Transactions on Communications, vol. COM-30, No. 11, Nov. 1982, pp. 2421-2433.
Measurements of Echo Parameters Pertinent to High Speed Full Duplex Data Transmission on Telephone Circuits", P. Wittke et al., IEEE Journal Selected Areas in Communications, vol. SAC-2, No. 5, Sep. 1984, pp. 703-710.
"Jointly Adaptive Equalization and Carrier Recovery in Two-Dimensional Digital Communication Systems" D. D. Falconer, the Bell Systems Technical Journal, vol. 55, No. 3, Mar. 1976, pp. 317-335.
"A Passband Data-Driven Echo Canceller for Full-Duplex Transmission on Two-Wire Circuits", S. Weinstein, I.E.E.E. Transactions on Communications, vol. COM-25, No. 7, Jul. 1977.
"A Phase Adaptive Structure for Echo Cancellation", Gitlin et al., IEEE Transaction on Communications, vol. COM-26, No. 8, Aug. 1978, pp. 1211-1220.
"Adaptive Reference Echo Cancellation", D. Falconer, IEEE Transactions on Communications, vol. COM-30, No. 9, Sep. 1982, pp. 2083-2094.
"Effects of Channel Impairments on the Performance of an In-Band Data-Driven Echo Canceller", J. J. Werner, AT&T Technical Journal, vol. 64, No. 1, Jan. 1985, pp. 91-113.
Speeds Pick Up in Leased Line and Dialup Modems", M. Chester, Electronic Products, Jan. 2, 1986, pp. 31-36.

Primary Examiner—Jin F. Ng
Assistant Examiner—R. Vaas
Attorney, Agent, or Firm—James E. Maslow; Thomas J. Engellenner

[57] ABSTRACT

A method for eliminating echos in modems used for full-duplex data communication is disclosed. The technique improves the cancellation of the echos by synthesizing an estimate of the desired signal and subtracting this estimate from the received waveform to improve the estimate of the residual echo. An adaptive filter is used to match the transmitted bit pattern to make an estimate of the frequency offset in the far echo, so that it can be cancelled more accurately.

16 Claims, 3 Drawing Sheets

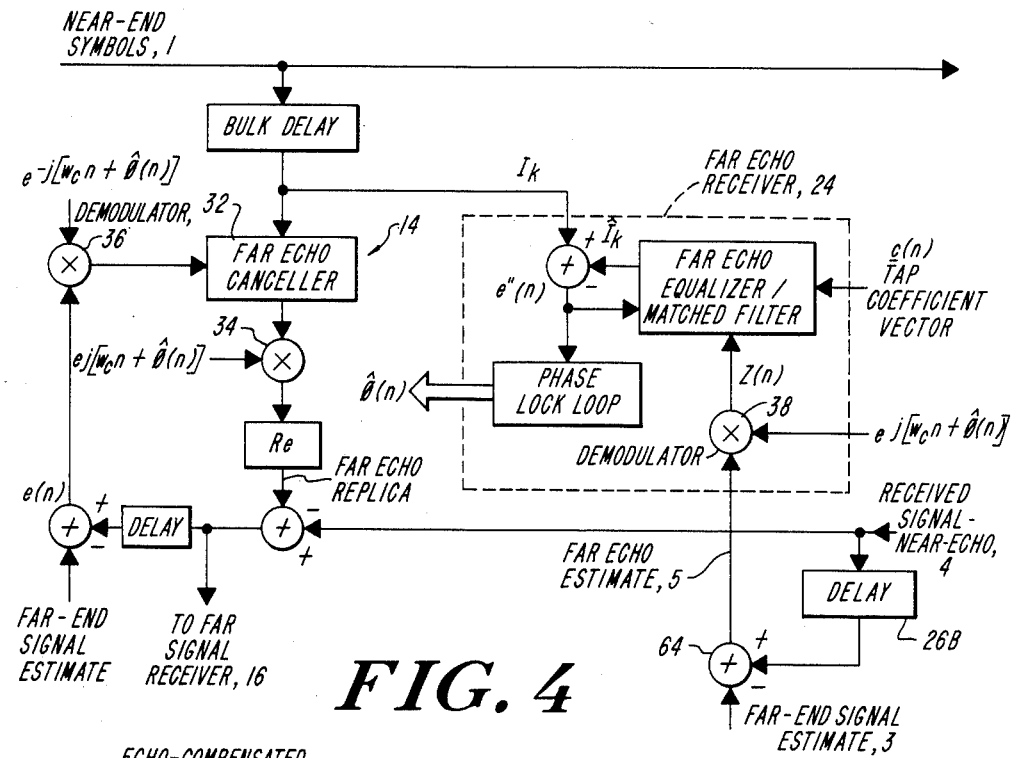
FIG. 4
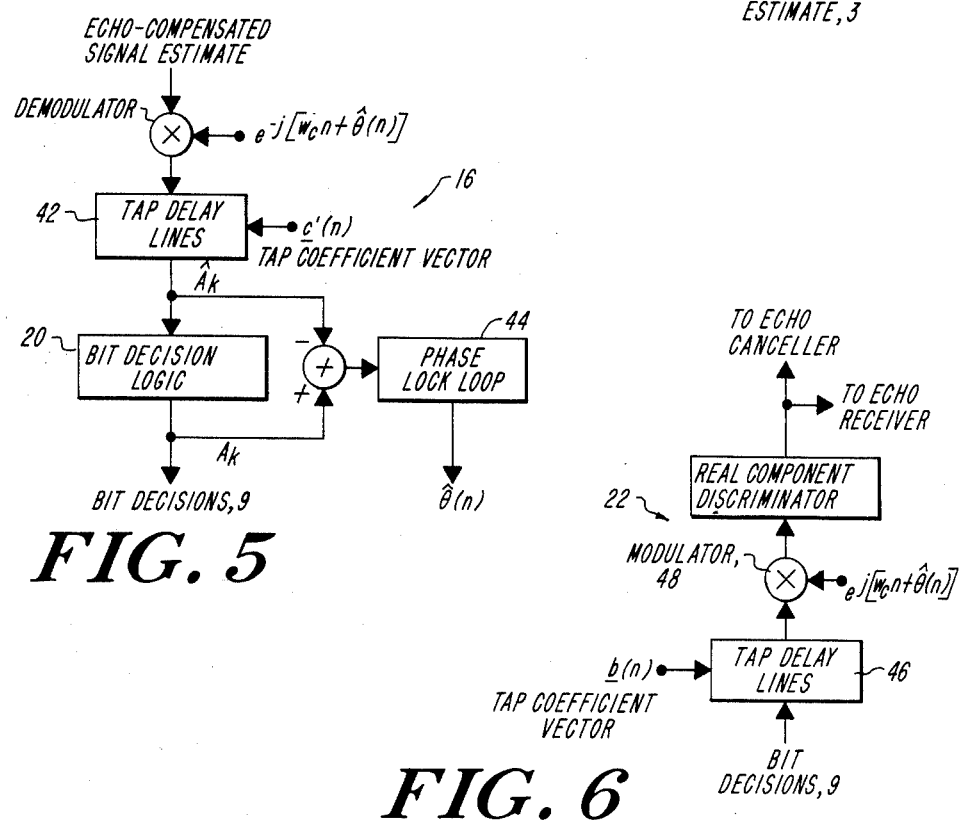
FIG. 5
FIG. 6

NEAR AND FAR ECHO CANCELLER FOR DATA COMMUNICATIONS

BACKGROUND OF THE INVENTION

The Government has rights in this invention pursuant to Contract Number F19628-85-C-0002 awarded by the National Security Agency.

The technical field of this invention is data communication and, in particular, echo cancellation.

The invention involves techniques for implementing improved modems for full-duplex communication of data over standard telephone lines or other communication links. At high data rates (i.e. 2400 bps, 4800 bps, 9600 bps or higher) the performance of full-duplex modems is limited primarily by echos introduced in the telephone plant by imperfectly-matched hybrid transformers at the transition points between 2-wire (bidirectional) and 4-wire (unidirectional) transmission.

Echos can occur in two places. A near echo is generated within the modem at the point at which it connects to the local subscriber loop. It typically has a small delay and a small amount of linear dispersion introduced by the frequency characteristics of the components along this path. Its level will typically be much larger than the received signal.

A far echo is generated at the far end of the connection where the 4-wire long-haul connection is converted for transmission on the local loop. The far echo will have a large delay, a significant amount of linear dispersion resulting from transversing the entire channel twice, and non-linear distortions which include a carrier frequency offset resulting from the local oscillator errors in the telephone plant and phase offsets including abrupt carrier phase changes ("phase hits") typically caused by conversions from one carrier to another within the system.

In addition to the frequency and phase problems associated with the far echo, devices which attempt to cancel echoes from incoming data must contend with interference of the desired far-end signal ("double talk"), interference of the echos themselves (e.g., the near echo as interference to the far echo), and white or impulse-like background noises, all of which exist as steady-state conditions in full-duplex mode. Currently, starting an echo-cancelling modem often requires that the modem operate in half-duplex mode, over the duration of an initial preamble. Furthermore, in order to maintain adequate echo suppression when the modem enters full-duplex mode, because of interference, cancellers are often sluggish in their response to changes in the echo paths.

Various attempts have been made to construct adaptive echo cancelling devices which deal with the signal interference problem. For example in U.S. Pat. No. 4,535,206 issued to Falconer on Aug. 13, 1985, a "decision-directed" far-end signal estimate is subtracted from the received signal to obtain an improved estimate of the echo residual. This estimate is then used to drive the adaptation of a near echo canceller. Unfortunately, adaptive echo cancellers at present typically are unable to provide satisfactory results in tracking and suppressing the far echo, particularly at high data rates. Only a slight amount of frequency offset, for example, in the far echo can result in considerable loss of suppression in a conventional canceller.

There exists a need for improved adaptive echo cancelling devices for data communications. In particular, an echo canceller which can accurately track and suppress both near and far echoes at high data transmission rates (i.e. at 2400 bps. or higher) would satisfy a substantial need in the art.

SUMMARY OF THE INVENTION

A full duplex echo cancelling voice band data modem is disclosed which is capable of continuous and rapid adaptation to suppress both near echoes and far echoes, even when the latter includes variable frequency offsets and abrupt phase changes. Far echoes are determined in a decision-directed, adaptive manner with a "far-echo receiver" structure which estimates the far-echo channel and the frequency offset in the far echo after subtracting the far end signal and the near echo.

In accordance with the invention, a reconstruction of the far-end signal and a reconstruction of the near echo are employed to enhance the far echo and estimate its frequency offset. In one illustrated embodiment, the frequency offset is determined within the far-echo receiver by an equalizer and a phase-locked loop circuit. The frequency offset estimates are used to iteratively refine the far echo estimate and thereby obtain an almost echo-free determination of the far signal.

In another aspect of the invention, iterative frequency offset estimations are also made for the far-end signal. In the illustrated embodiments a far end signal receiver is disclosed which also employs an equalizer and a phase-locked loop circuit. The far signal frequency offset estimates are used to iteratively refine the far signal estimate. This refined far signal estimate (and a replica of the near echo) are subtracted from the received signal to obtain a far echo estimate which is operated upon by the far echo receiver.

The present invention applies the "decision-directed" technique to improve performance of the far echo canceller. While it is known from U.S. Pat. No. 4,535,206 (described above) that decision-directed techniques can be used to improve near echo cancellation, it is demonstrated herein that this technique can also be applied to far echo cancellation when the frequency offsets are taken into account.

Both the near and far echo cancellers of the present invention can use the "decision directed" technique to improve performance. In the illustrated embodiments, a channel simulator associated with the far-end signal receiver attempts to synthesize the received signal (including dispersion from the channel) based on the bit decisions made at the receiver. By subtracting the estimated signal from the received signal, better estimates of the near echo and then the residual far echo are obtained, thus improving the echo cancellation. In estimating the far echo, this procedure is particularly important since it allows the use of a separate echo receiver structure to lock onto the far echo and estimate its frequency offset, thus permitting it to be cancelled most effectively.

Adaptive filters with complex taps can be used to estimate the near echo, the far echo and the received signal. In one preferred embodiment the filters are adapted at the sampling rate and a least mean squares (LMS) method is used for iterative updating of the tap coefficients. In addition, two adaptive receivers (which are formed by adaptive filters combined with matched filters) are used to demodulate the far-end signal and the far echo.

Broadly, the invention encompasses an arrangement for receiving a far end-generated signal carried on an incoming signal which is affected by a frequency-offset echo of a near end-generated signal. The arrangement includes (1) echo cancelling means for generating an echo-compensated incoming signal estimate as a function of the difference between an echo estimate and the incoming signal, the echo estimate being formed by modifying the near end signal to replicate the frequency-offset echo, (2) a far end signal receiver connected to the echo cancelling means for generating a far end signal estimate from the echo-compensated incoming signal estimate, and (3) an echo receiver connected to the echo cancelling means and the far end signal receiver for generating refined echo estimates as a function of the difference between delayed samples of the incoming signal and the far end signal estimate.

The invention will next be described in connection with certain illustrated embodiments; however, it should be clear that various modifications, additions and subtractions can be made by those skilled in the art without departing from the spirit or scope of the invention.

BRIEF DESCRIPTION OF THE DRAWINGS

FIG. 4 is a detailed diagram of the far echo receiver component of the apparatus of FIG. 1.

FIG. 5 is a detailed diagram of the far signal receiver component of the apparatus of FIG. 1.

FIG. 6 is a detailed diagram of the channel simulator component of the apparatus of FIG. 1.

DETAILED DESCRIPTION

Figure 1:
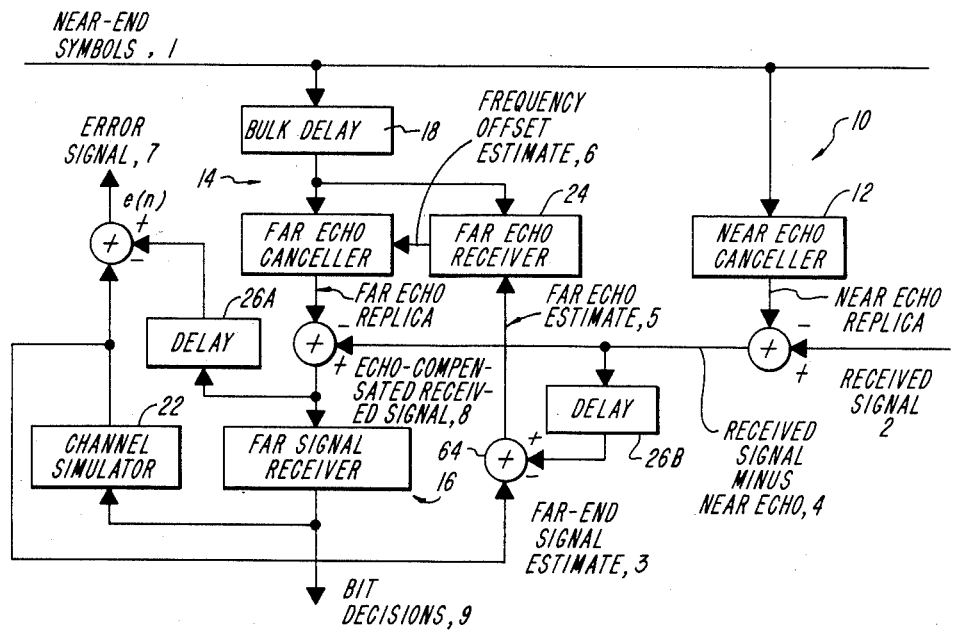
FIG. 1 is an overall block diagram of echo cancellation apparatus illustrating the present invention.

The echo formation process begins at the near-end transmitter. The signal creation requires a complex symbol generator, a pulse shaper, and a modulator whose output is made real. The resulting transmitted signal is given by $$t(n) = Re\left[\sum_k I_k p(n - Lk)\exp[j\omega_c nT]\right] \quad (1)$$

where $I_k$ represents the transmitted near-end complex symbols, p(n) is the value of the shaping pulse at time nT (where T is the sampling interval and which henceforth is assumed to be unity), 1/L is the symbol (or baud) rate, and $\omega_c/2\pi$ is the carrier frequency. When t(n) is passed through a noisy linear channel, and returned to the receiver as an echo, s(n), it takes on the form $$s(n) = Re\left[\sum_k I_k g(n - Lk)\exp[j\omega_c N + \phi(n)]\right] + w(n) \quad (2)$$

where g(n) is the composite baseband impulse response consisting of the convolved transmit pulse and echo channel, and w(n) is a realization of additive noise typically white or impulse-like. The phase shift $\phi(n)$ is inserted by the channel and is generally time-varying of the form $$\phi(n) = \sum_{m=o}^{n} \delta\phi_m + \phi_o(n) \quad (3)$$
$$= \omega_o n + \phi_o(n)$$

where $\delta\phi_m$ represents the incremental phase change due to a frequency offset $\omega_o$ and wher $\omega_o$ (n) may o consist of abrupt carrier phase changes ("phase hits") and phase jitter (typically quasi-periodic).

Generally, the near echo suffers from only linear channel distortion introduced by the local hybrid, while the far echo can suffer from all distortions given by (2) and (3). The desired signal transmitted from the far end is also disturbed by linear channel distortion, additive noise, and carrier phase distortions. This distorted signal will be denoted by f(n) and thus the complete received signal can be written as $$r(n) = s_N(n) + s_F(n) + f(n) + w(n) \quad (4)$$

where $s_N(n)$ and $s_F(n)$ denote the near and far echos, respectively.

In the conventional approach to near and far echo cancellation, the near-end signal is passed through operators which attempt to emulate the echo formation process. The output of these operators result in echo estimates which are subtracted from the received signal before the receiver performs channel equalization and makes its decisions about the far-end symbols. A bulk delay is introduced before the far-echo canceller to account for the round trip delay time of the transmitted signal thereby reducing the required number of far-echo canceller taps.

In order to simulate linear channel distortion, each canceller typically requires a finite-impulse response (FIR) filter whose taps are estimated adaptively. A steepest decent approach is often used to minimize the average squared error between the echo estimates and the received signal, leading to the least mean squares (LMS) update for estimating the canceller coefficients, while other faster adaptation procedures such as recursive least squares (RLS) estimation have also been applied. Carrier phase distortion in the far echo can also be estimated using adaptive procedures.

Since the adaptation in these methods ideally relies on the error between the actual echo and the echo estimate, the far-end signal introduces a large noise source to the adaptation processes. In addition, the far echo acts as a noise source to the near-echo canceller and vice versa. The present invention addresses these problems by preventing each signal from acting as interference in the various adaptation processes.

In FIG. 1 a system 10 for near and far echo cancellation is presented in which separate estimates of the near echo and the far echo (generated by the near echo canceller 12 and the far echo canceller 14, respectively) are subtracted from the incoming signal 2 before it enters the far-end signal receiver 16. A round trip bulk delay element 18 is placed before the far-echo canceller 14 to compensate for the far echo travel time. This delay can be determined by adaptive procedures during the start-up of the system.

In addition, summer 64 substracts the far-end signal estimate 3, derived from channel simulator 22, from the received (minus near echo) signal 4, to obtain a separate far echo estimate 5. This far echo estimate 5 is used by far echo receiver 24 to estimate the frequency offset in the far echo. The frequency offset estimate 6 is used in turn to correct the output of the far echo canceller 14. Since this procedure eliminates the effect of the far-end signal and near echo on the estimation process, the frequency offset 6 can be tracked in full-duplex (or "double-talk") mode. Delays 26A, 26B (equal to the sum of the half-lengths of the receiver 16 and simulator 22) are incorporated to account for the processing time required by the channel equalizer and channel simulator.

Both the near-echo adaptive canceller 12 and far-echo adaptive canceller 14 and channel simulator 22 are driven by the residual e(n) error signal 7 obtained by subtracting the far-end signal estimate 3 and the two echo estimates from the received signal. Thus the far-end signal does not act as interference to either the near- or far-echo canceller adaptation In addition, the far echo is not a source of interference to the near-echo canceller adaptation (or vice versa). The end result is a high performance system for obtaining data bit decisions 9.

Figure 2:
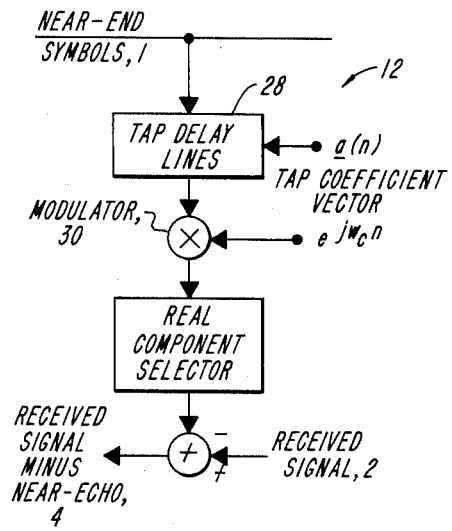
FIG. 2 is a detailed diagram of the near-echo cancellation component of the apparatus of FIG. 1.

In FIG. 2 the near echo canceller 12 is shown in more detail. In the illustrated embodiment the canceller 12 is implemented by tapped delay line 28 which act upon the near end symbols 1 in response to an adaptive tap coefficient vector a(n) which is updated as follows:

$$a(n+1) = a(n) + \mu x^*(n)e(n)exp[-j\omega_c n] \quad (5)$$

where $\mu$ is the convergence gain, $x^*$ is the complex conjugate of the data symbol vector, e(n) is the residual error, and $exp[-j\omega_c n]$ is the modulator. The real component of the output of modulator 30 is used to obtain a near echo signal. This signal is subtracted from the received signal 2 to obtain a received (minus near echo) signal 4.

Figure 3:
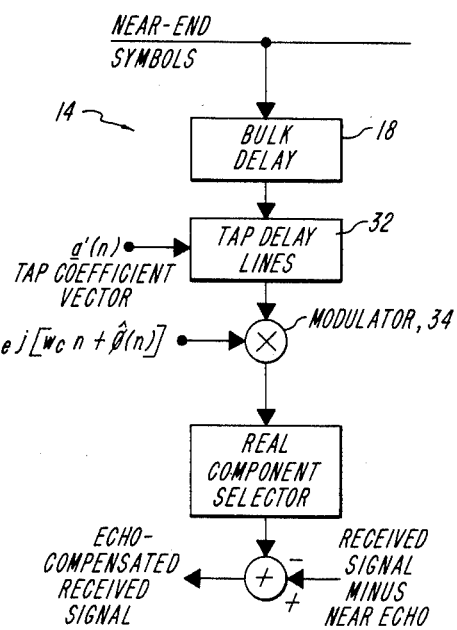
FIG. 3 is a detailed diagram of the far-echo cancellation component of the apparatus of FIG. 1.

In a similar fashion FIG. 3 shows the far echo canceller 14 in more detail. As illustrated, the canceller 14 is implemented by a suitable bulk delay 18 (for example a clock gated memory device) and tapped delay line 32 which acts upon the near end symbols 1 in response to a second adaptive tap coefficient vector a'(n) which is updated as follows $$a'(n+1) = a'(n) + \mu x'^*(n)e(n)exp[-j(\omega_c n + \hat{\phi}(n))] \quad (6)$$

where $\mu$ is again the (possibly different) convergence gain, and $x'^*$ is the complex conjugate of the bulk delayed data symbol vector. In this instance the modulator includes a term $\hat{\phi}(n)$, which is the estimate of the phase shift (as defined in equation 3 above). Again the real component of the output of modulator 34 is used to obtain a far echo signal. This signal is subtracted from the received (minus near echo) signal 4 to obtain a signal 8 free of both near and far echoes.

An expanded view of the adaptive far echo receiver 24 and far-echo canceller 14 is shown in FIG. 4. The far echo receiver 24 performs joint adaptive equalization/matched filtering and phase tracking. The equalizer/matched filter 56 compensates for linear echo channel distortion and estimates, from a far-echo estimate 5 (discussed below), the complex symbols transmitted from the near end. Since the actual near-end symbols 1 are known, a "decision" error residual can be formed which drives the equalizer. Both the symbol estimation and equalizer adaptation occur at the baud rate. The error residual also drives a second-order phase lock loop 58 whose put $\hat{\phi}(n)$ consists of a linearly changing phase due to frequency offset and constant phase offset contribution (representing estimates of the the components of Equation 3 above) This phase correction is used in the modulator 34 at the far-end canceller's output and also in the two demodulators 36, 38 which translate to baseband the echo residual and the input of the far-echo equalizer.

The iterative phase and frequency computations in the echo receiver can be defined as follows:

$$\hat{\phi}(n+1) = \hat{\phi}(n) + \hat{\omega}_o(n) + k_1 \Delta \hat{\psi}(n) \quad (7)$$

$$\hat{\omega}_o(n+1) = \hat{\omega}_o(n) + k_2 \Delta \hat{\psi}(n) \quad (8)$$

where $$\Delta \hat{\psi}(n) = \sin[\tilde{\psi}(n) - \hat{\psi}(n)] \quad (9)$$

and where $\hat{\phi}(n)$ is the estimated far echo phase offset, $\hat{\omega}_o(n)$ is the estimated far echo frequency offset, $\hat{\psi}(n)$ is the estimated near end data symbol phase and $\tilde{\psi}(n)$ is the actual near end data symbol phase. Equations (7), (8) and (9) define a second order phase locked loop.

The equalizer/matched filter component 56 of the far echo receiver 24 can also be implemented by tapped delay lines and, the tap coefficient vector c(n) is preferably iteratively updated as follows $$c(n+1) = c(n) + \mu e''(n) z(n) \quad (10)$$

where $\mu$ is again a convergence gain, where e''(n) is the difference between the near end symbol (actually sent) and the estimated symbol derived from the far echo equalizer, and z(n) is the demodulated far echo estimate vector.

In FIG. 5 the far signal receiver 16 is shown in more detail. The far signal receiver includes a demodulator 40 (which converts the far signal estimate to baseband) and an equilizer which compensates for linear distortion in the channel by tap delay lines 42 which act upon the far signal estimate in response to an adaptive tap coefficient vector c'(n) as follows $$c'(n+1) = c'(n) + \mu e'(n) v(n) \quad (11)$$

where $\mu$ is another convergence gain factor e'(n) is the difference between the far-end symbol estimate and the actual far end symbol and v(n) is the demodulated far signal estimate.

The equalized far signal estimate $\hat{A}_k$ from the tap delay lines 42 is feed to the bit decision logic 20 where far signal data bit decisions 9(or $\hat{A}_k$) are made. Differences between the equalized signal and the bit decisions provide the input to another phase lock loop 44 where $\hat{\theta}(n)$, the far signal phase offset estimate is generated in a manner similar to the computation of $\hat{\phi}(n)$ discussed above.

In FIG. 6 the channel simulator 22 is shown. The simulator serves to estimate the far-end signal based on the bits decisions 9 derived from the far signal receiver 16 and decision logic 20 discussed above. Simulator 22 includes tap delay lines 46 which act upon the bit decisions 9 in response to an adaptive tap coefficient vector b(n) which is updated as follows:

$$b(n+1) = b(n) + \mu y^*(n)e(n)exp[-j\omega_c n + \hat{\theta}(n)]$$

where $\mu$ is the convergence gain, $y^*$ is the complex conjugate of the data symbol vector in the channel simulator, $\hat{\theta}(n)$ is the far signal phase offset estimate (shown in FIG. 5), $e(n)$ is the error signal, and $\exp[-j\omega_c n + \hat{\theta}(n)]$ is the phase corrected modulator. The signal is modulated by modulator 48 and the real component of this modulated signal is employed as a far signal estimate in the frequency offset estimation process discussed above in connection with FIG. 4.

Figure 7:
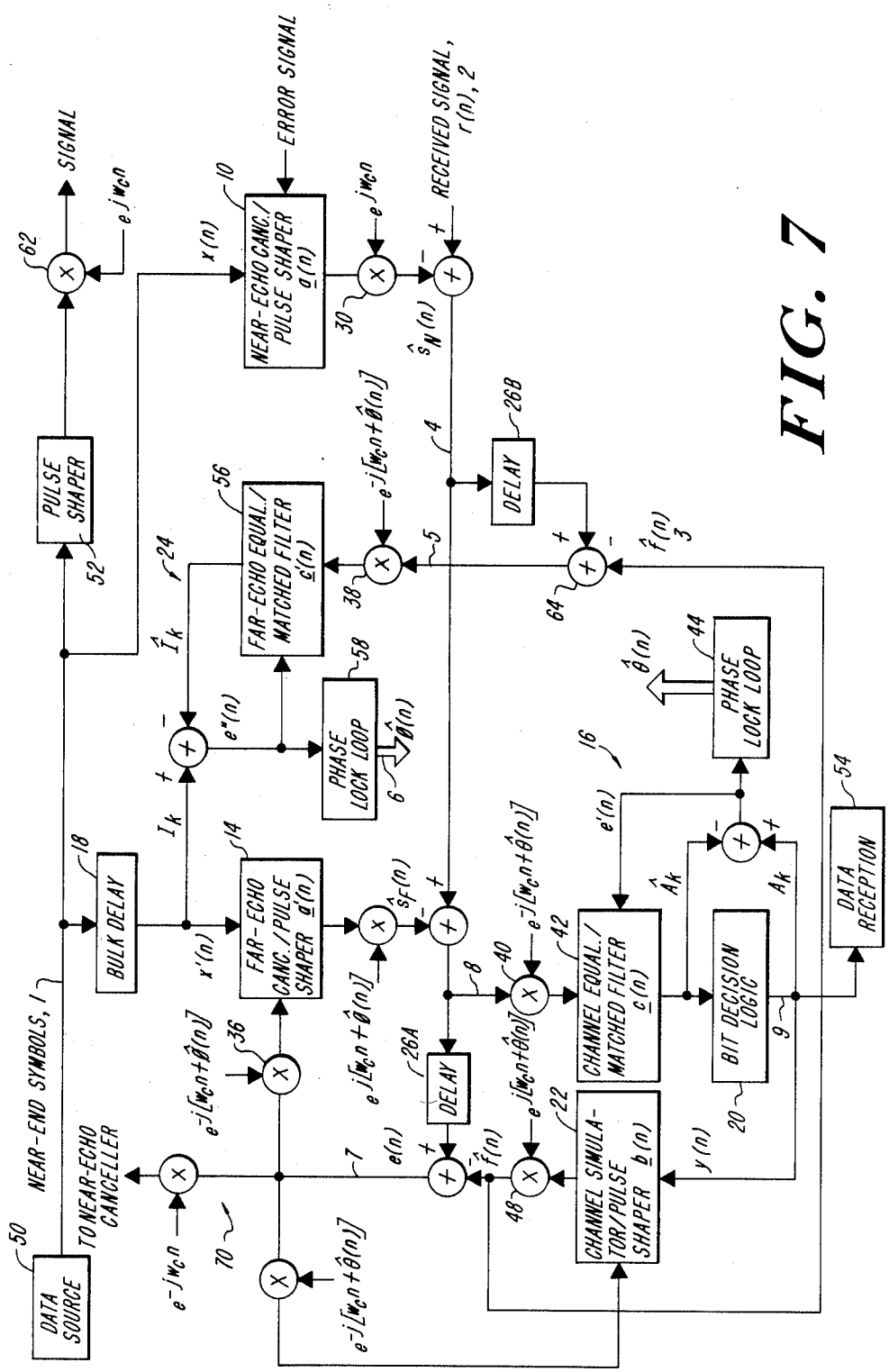
FIG. 7 is a detailed overall diagram of a modem incorporating the echo-cancellation apparatus of FIG. 1.

FIG. 7 is an overall diagram of a modem terminal 60 showing the components discussed above in a modem application. In this configuration the terminal 60 includes a transmission section which contains a data source 50 and a pulse shaper 52. Data source 50 produces a baseband stream of near end data symbols 1 which are shaped and modulated for transmission by pulse shaper 52 and modulator 62, respectively. As shown in FIG. 7, the error signal $e(n)$ is demodulated by three different factors in circuit 70 to obtain three residuals for adaptation of the tap coefficients in the adaptive filters. The various components responsible for echo cancellation are essentially identical to those discussed and described above in FIGS. 1-6 and have the same reference numbers. The end result of the echo canceller, after a sufficient number of adaptive iterations is a data bit stream 9 which is received by data reception element 54.

The components of the present invention can be implemented in various manners, and a wide range of equivalents can be used. For example, the tap delay lines used in the adaptive filters and receivers described above can be implemented by programmable processor hardware, such as an AT&T WE DSP 32 chip manufactured by American Telephone and Telegraph Company. Various other commercial companies manufacture comparable digital signal processing microcomputer chips. Alternatively, the adaptive elements may be implemented as custom integrated circuit chips. It should be clear that other update techniques can be substituted for the least mean squares (LMS) method of updating tap coefficients. Alternative techniques include recursive least squares and frequency domain procedures. Moreover, the tap delay lines could be replaced by lattice filter structures. Various initialization techniques can be employed. For a detailed review of adaptive techniques, see Widrow and Stearns, *Adaptive Signal Processing*, (Prentice Hall, Englewood Cliffs, N.J. 1985).

The equalizers used in the far signal receiver and the far echo receiver can be broken down into their constituent parts (i.e., a pulse shaper and a matched filter). The adaptive components of the receivers can also be updated with recursive or lattice structures. Non decision-directed techniques can be used to suppress the near echo.

A variety of techniques are also available for determining frequency offsets. The phase lock loop elements described above can also be implemented by programmable processor elements or custom circuitry. The PLL procedures can also compensate for phase jitter by incorporating known techniques. For a review of techniques and iterative equations for implementing PLL's, see Van Trees, *Detection, Estimation and Modulation in Theory*, Volume 1 (Wiley, New York, N.Y. 1968) and Stiffler, *Theory of Synchronous Communications* (Prentice Hall, Engeleood Cliffs, N.J., 1971).

A passband version of the present invention can also be implemented by eliminating certain modulators and allowing the filters to operate in the passband. In such an implementation, the system would be signal driven rather than data driven. Additionally, the error signal that drives the adaptive filters can be complex rather than real. In the implementation described above only the real component is employed. Alternatively, one could keep both the real and imaginary parts of the filter output.

Moreover, in particular situations where more than one frequency-offset far echo is encountered, it should be clear that the principles disclosed in here can be applied to address such multiple far echo cancellation problems as well. Finally, the principles taught herein are applicable to a wide range of data transmission rates (e.g., 2400 bps., 4800 bps., or higher).

We claim:

1. An arrangement for receiving a far end-generated signal carried on an incoming signal which is affected by a frequency-offset far echo of a near end-generated signal, the arrangement comprising
   echo cancelling means for generating an echo-compensated incoming signal estimate as a function of the difference between a far echo estimate and the incoming signal, the far echo estimate being formed by modifying the near end signal to replicate the frequency-offset far echo,
   a far end signal receiver connected to the echo cancelling means for generating a far end signal estimate from the echo-compensated incoming signal estimate, and
   an echo receiver connected to the echo cancelling means and the far end signal receiver for refining the far echo estimate as a function of the difference between delayed samples of the incoming signal and the far end signal estimate and further including means for estimating the frequency offset of the far echo to refine the far echo estimate.

2. The invention of claim 1 wherein the echo cancelling means includes an adaptive filter having means for generating a plurality of coefficients, means for multiplying data from the near end-generated signal with said coefficients and means for summing the resulting products.

3. The invention of claim 2 wherein the echo cancelling means further includes means for iteratively revising the filter coefficients until a suitable echo-compensated signal estimate is obtained.

4. The invention of claim 2 wherein the echo cancelling means further includes a delay element which provides a time delay before the near end-generated data is processed by the adaptive filter.

5. The invention of claim 1 wherein the far end signal receiver further includes a matched filter having means for generating a plurality of coefficients, means for multiplying data from the echo-compensated incoming signal with the coefficients and means for summing the results.

6. The invention of claim 5 wherein the far end signal receiver further includes means for iteratively revising the filter coefficients until a suitable far signal estimate is obtained.

7. The invention of claim 6 wherein the far end signal receiver further includes means for correcting a frequency offset by applying a phase correction signal to the echo compensated signal estimate.

8. The invention of claim 7 wherein the phase correction signal is determined by a phase lock loop circuit.

9. The invention of claim 7 wherein the means for correcting the frequency offset also applies a phase correction signal to the far signal estimate.

10. The invention of claim 5 wherein the far end signal receiver further includes bit decision logic for estimating the data symbols in the far end signal.

11. The invention of claim 10 wherein the far end signal receiver also includes a channel simulator for reconstructing the far end signal estimate from the output of the bit decision logic.

12. The invention of claim 1 wherein the echo receiver further includes an adaptive matched filter having means for generating a plurality of coefficients, means for multiplying delayed, near end-generated data with said coefficients, and means for summing the resulting products to further refine the far echo estimate.

13. The invention of claim 12 wherein the echo receiver further includes means for iteratively revising the filter coefficients until a suitable echo estimate is obtained.

14. The invention of claim 12 wherein the echo receiver further includes means for correcting a frequency offset by applying a phase correction signal to the far echo estimate.

15. The invention of claim 14 wherein the phase correction signal is determined by a phase lock loop circuit.

16. The invention of claim 1 wherein the echo receiver further includes an adaptive matched filter to further refine the far echo estimate and means for correcting a frequency offset by applying a phase corrector signal to the far echo estimate, and, wherein the means for correcting the frequency offset also applies a phase correction signal to the echo cancelling means to replicate the far echo.

* * * * *

UNITED STATES PATENT AND TRADEMARK OFFICE
CERTIFICATE OF CORRECTION

PATENT NO. : 4,742,510
DATED : May 3, 1988
INVENTOR(S) : Quatieri, Jr. et al.

It is certified that error appears in the above-identified patent and that said Letters Patent is hereby corrected as shown below:

Column 3, line 31, delete the comma after "component".

Column 4, line 11, wher $\omega_O(n)$" should read --where $\Phi_O(n)$--.

Column 6, line 5, after "above)", add a period.

Column 6, line 19, Equation (9) should read:

$$--\Delta\psi(n) = \sin[\hat{\psi}(n)-\psi(n)]--.$$

Column 6, line 23, "$\hat{\psi}(n)$" should read --$\psi(n)$--.

Column 6, line 46, after "gain factor", add a comma.

Signed and Sealed this

Sixth Day of September, 1988

*Attest:*

DONALD J. QUIGG

*Attesting Officer*  *Commissioner of Patents and Trademarks*